US011685601B2

(12) United States Patent
Chen et al.

(10) Patent No.: US 11,685,601 B2
(45) Date of Patent: Jun. 27, 2023

(54) STORAGE AND PICKUP APPARATUS WITH BATCH EXPRESS DELIVERY STORAGE AND RESERVED EXPRESS DELIVERY PICKUP FUNCTIONS, AND STORAGE AND PICKUP METHOD

(71) Applicant: HANGZHOU DONGCHENG ELECTRONIC CO., LTD., Zhejiang (CN)

(72) Inventors: Changlin Chen, Zhejiang (CN); Zhonghua Chai, Zhejiang (CN); Lei Shen, Zhejiang (CN)

(73) Assignee: HANGZHOU DONGCHENG ELECTRONIC CO., LTD., Zhejiang (CN)

( * ) Notice: Subject to any disclaimer, the term of this patent is extended or adjusted under 35 U.S.C. 154(b) by 483 days.

(21) Appl. No.: 16/757,259

(22) PCT Filed: Sep. 29, 2019

(86) PCT No.: PCT/CN2019/109111
§ 371 (c)(1),
(2) Date: Apr. 17, 2020

(87) PCT Pub. No.: WO2020/043219
PCT Pub. Date: Mar. 5, 2020

(65) Prior Publication Data
US 2021/0094760 A1    Apr. 1, 2021

(30) Foreign Application Priority Data

Aug. 27, 2018 (CN) .......................... 201810977613.9

(51) Int. Cl.
*G06F 7/00* (2006.01)
*B65G 1/137* (2006.01)
(Continued)

(52) U.S. Cl.
CPC ......... *B65G 1/1371* (2013.01); *G05B 19/416* (2013.01); *G06Q 10/0836* (2013.01); *G06Q 50/28* (2013.01); *G05B 2219/45054* (2013.01)

(58) Field of Classification Search
CPC .... B65G 1/1371; B65G 1/1373; G06Q 10/04; G06Q 10/087
(Continued)

(56) References Cited

U.S. PATENT DOCUMENTS

| 9,120,624 B1* | 9/2015 | Cassady | G06Q 10/0836 |
| 2008/0319790 A1* | 12/2008 | Vahlberg | G16H 20/13 705/2 |
| 2020/0239229 A1* | 7/2020 | Tovey | G07F 11/32 |

FOREIGN PATENT DOCUMENTS

| CN | 103495560 A | 1/2014 |
| CN | 107358754 A | 11/2017 |

(Continued)

*Primary Examiner* — Yolanda R Cumbess
(74) *Attorney, Agent, or Firm* — Muncy, Geissler, Olds & Lowe, P.C.

(57) ABSTRACT

An express delivery conveying device is controlled by a controller and moves back and forth between a storage and pickup port and storage units to realize warehousing-in and warehousing-out operations of express deliveries. A plurality of temporary storage units are provided on the storage racks. Temporary storage cabinet doors corresponding to the temporary storage units one to one are provided on the case. The temporary storage cabinet doors are electrically connected with the controller and are capable of being opened or closed under the control of the controller for temporary storage or pickup of express deliveries. The express delivery conveying device is capable of conveying express deliveries in the temporary storage units to the storage units or conveying express deliveries in the storage units to the temporary storage units under the control of the controller.

9 Claims, 7 Drawing Sheets

(51) Int. Cl.
*G05B 19/416* (2006.01)
*G06Q 10/0836* (2023.01)
*G06Q 50/28* (2012.01)

(58) Field of Classification Search
USPC .................................. 700/213–216, 231–232
See application file for complete search history.

(56) References Cited

FOREIGN PATENT DOCUMENTS

| | | | |
|---|---|---|---|
| CN | 107464371 A | | 12/2017 |
| CN | 107833391 A | | 3/2018 |
| CN | 108402866 A | * | 8/2018 |
| CN | 108402866 A | | 8/2018 |
| CN | 109087463 A | | 12/2018 |
| CN | 208673453 U | | 3/2019 |
| JP | 2001182396 A | | 7/2001 |

* cited by examiner

STORAGE AND PICKUP APPARATUS WITH BATCH EXPRESS DELIVERY STORAGE AND RESERVED EXPRESS DELIVERY PICKUP FUNCTIONS, AND STORAGE AND PICKUP METHOD

FIELD OF THE INVENTION

The present invention belongs to the field of express delivery storage and pickup apparatuses, in particular to a storage and pickup apparatus with batch express delivery storage and reserved express delivery pickup functions, and storage and pickup methods.

BACKGROUND OF THE INVENTION

Common express delivery storage and pickup apparatuses are usually in the form of express delivery cabinets, and each consists of a plurality of unit cabinets with different sizes. The door of each unit cabinet is controlled by a controller for operating a main cabinet. When a delivery man stores an express delivery, the controller receives a storage instruction and opens the door of a designated unit cabinet for storing the express delivery. When a receiver picks up the express delivery, the controller receives an express delivery pickup instruction and opens the door of the designated unit cabinet for taking out the express delivery. People usually use unit cabinets with height of 0.5 m-1.5 m. Therefore, in order to serve most ordinary people, the height of the express delivery cabinets is limited, which is usually configured to be smaller than 2 m. Therefore, there is a waste of space from the top of the express delivery cabinet to the indoor ceiling. When the express delivery cabinet is placed in the outdoor/street, due to the height limitation, the expansion requires the increase of the floor area, which is not conducive to the outdoor/street planning.

There is also a new type of express delivery storage apparatus, which is in the form of express delivery tower. The height can be configured to be greater than 2.5 m or even 5 m. An express delivery conveying device and a plurality of rows of storage racks are provided in the express delivery tower. The plurality of rows of storage racks are arranged around the express delivery conveying device. A plurality of storage units are provided on each storage rack. Only one storage and pickup port is provided in the express delivery tower. After the express delivery is put into the storage and pickup port, the cabinet door at the storage and pickup port is closed, and the controller controls the express delivery conveying device to convey the express delivery to a certain storage unit to complete the warehousing-in operation. When the express delivery is picked up, the controller controls the express delivery conveying device to take out the express delivery from the designated storage unit and convey it to the storage and pickup port, and opens the cabinet door to complete the warehousing-out operation. The structure of this express delivery tower realizes the warehousing-in and warehousing-out operations of goods through the express delivery conveying device, which makes the height of the apparatus no longer limited to smaller than 2 m. When it is used indoors, it can be customized according to the floor height. When it is used outdoors, it can be expanded by increasing the height, thus effectively reducing the floor area, facilitating the land planning and improving the space utilization rate.

However, this express delivery tower type express delivery storage and pickup apparatus still has defects in actual use.

The storage and warehousing-in operation is a continuous action. Therefore, when a delivery man stores a plurality of express deliveries, it is necessary to wait for the previous express delivery to be warehoused in and the express delivery conveying device to return to the location of the storage and pickup port, before the cabinet door at the storage and pickup port is opened again to store the next express delivery. Generally, each storage and warehousing-in action needs about 20 seconds, so the time is long. The delivery man needs to spend much time in front of the express delivery storage and pickup apparatus.

Similarly, the warehousing-out and pickup operation is also a continuous action. When the receiver picks up the express delivery, it is also necessary to wait more than 20 seconds in front of the express delivery storage and pickup apparatus in the working process that the express delivery conveying device completes the warehousing-out operation, so as to pick up the express delivery. The waiting time is long. When more than one person needs to pick up express deliveries or one person needs to pick up a plurality of express deliveries, the queue time is longer.

SUMMARY OF THE INVENTION

The present invention provides a storage and pickup apparatus with batch express delivery storage and reserved express delivery pickup functions, which can effectively shorten the time spent in storing and picking up express deliveries in a batch, improve the efficiency of a delivery man in storing express deliveries, effectively shorten the time spent by a receiver in picking up express deliveries, and improve the efficiency in picking up express deliveries.

In order to solve the above technical problem, the present invention adopts the following technical solution: a storage and pickup apparatus with batch express delivery storage and reserved express delivery pickup functions, comprising a case with a polygonal cross section, an express delivery conveying device provided in the case, a plurality of rows of storage racks distributed around the express delivery conveying device and a controller electrically connected with the express delivery conveying device, a plurality of storage units being provided on the storage racks, a storage and pickup port with a cabinet door being provided in the case, the cabinet door being electrically connected with the controller and being capable of being opened or closed to open or close the storage and pickup port under the control of the controller, the express delivery conveying device being controlled by the controller and moving back and forth between the storage and pickup port and the storage units to realize warehousing-in and warehousing-out operations of express deliveries, wherein a plurality of temporary storage units are provided on the storage racks, temporary storage cabinet doors corresponding to the temporary storage units one to one are provided on the case, the temporary storage cabinet doors are electrically connected with the controller and are capable of being opened or closed under the control of the controller for temporary storage or pickup of express deliveries, and the express delivery conveying device is capable of conveying express deliveries in the temporary storage units to the storage units or conveying express deliveries in the storage units to the temporary storage units under the control of the controller.

When a user needs to store express deliveries in a batch, the user may input a batch express delivery storage instruction into the storage and pickup apparatus. After receiving the instruction, the controller controls the temporary storage cabinet door corresponding to a certain idle temporary storage unit to be opened. After the user puts the express delivery into the temporary storage unit, the user closes the temporary storage cabinet door to complete the storage of the first express delivery. Then, the user may select to continue to store an express delivery. After receiving an instruction for continuing to store an express delivery, the controller controls the temporary storage cabinet door corresponding to the next idle temporary storage unit to be opened so that the user can put the next express delivery. After the user puts the second express delivery into the temporary storage unit, the user closes the temporary storage cabinet door to complete the storage of the second express delivery. Then, the user may select to continue to store an express delivery or end the storage of express deliveries.

After the temporary storage cabinet door is switched from an open state to a closed state (after the user stores the express delivery and closes the temporary storage cabinet door), the controller controls the express delivery conveying device to convey the express delivery in the temporary storage unit to the storage unit to complete a warehousing-in operation. After a plurality of temporary storage cabinet doors are sequentially closed, the controller controls the express delivery conveying device to sequentially convey the express deliveries in the corresponding temporary storage units to the storage units to complete a batch warehousing-in operation.

In the storage and pickup apparatus provided by the present invention, on the basis of providing one storage and pickup port to complete ordinary express delivery storage and pickup operations, the structure of temporary storage units is added, so that the express delivery storage and warehousing-in operation is no longer a continuous action, but two independent steps. The user can continue to store express deliveries and leave after the storage of express deliveries is completed, and the express delivery conveying device of the storage and pickup apparatus automatically completes the subsequent warehousing-in action, thus reducing the time spent in storing express deliveries in a batch, and not requiring the user to wait in front of the storage and pickup apparatus.

When the user needs to pick up an express delivery on reservation, the user may remotely send an instruction to the storage and pickup apparatus (the user sends the instruction to a server through a mobile terminal, and the server issues the instruction to the controller of the storage and pickup apparatus), and the controller controls the express delivery conveying device to convey the designated express delivery in the storage unit to the temporary storage unit. In other words, before the user arrives at the storage and pickup apparatus, the storage and pickup apparatus can independently complete the warehousing-out action, the user does not need to wait for the warehousing-out action in front of the storage and pickup apparatus, and thus time is saved. After the user arrives, the user may immediately input the instruction for picking up the express delivery. The controller controls the temporary storage cabinet door corresponding to the temporary storage unit to be opened for the user to take out the express delivery.

As an improvement, an operation and display device is provided on the case, the plurality of temporary storage units are provided on the storage racks on the left side and/or right side of the operation and display device, and the plurality of temporary storage units are arranged sequentially from top to bottom. The distance between the temporary storage units and the operation and display device is short. After the user inputs the instruction on the operation and display device, the user can immediately perform the express delivery storage or pickup operation to the nearby temporary storage unit, the operation is convenient to perform, the labor is saved, the range involved in the operation process can be effectively reduced and the user does not need to move back and forth.

As a structural improvement of the temporary storage unit, the size of the plurality of temporary storage units is the same. During batch storage of express deliveries, there is no need to select the size of the temporary storage units, so the storage speed is faster.

As another structural improvement of the temporary storage unit, the temporary storage units comprise first-size units, second-size units and third-size units, the storage space of the first-size units and the storage space of the second-size units are larger than the storage space of the third-size units, and the storage space of the first-size units is larger than the storage space of the second-size units. In other words, the first-size units, the second-size units and the third-size units in the temporary storage units are storage spaces with three different sizes respectively. During batch storage of express deliveries, the user can select the appropriate temporary storage units according to the size of the express delivery, and the space utilization rate of the storage and pickup apparatus is higher.

As a further improvement, the first-size units, the second-size units and the third-size units are arranged sequentially from top to bottom.

The present invention further provides an express delivery storage method adopting the storage and pickup apparatus, which comprises the following steps:

1) inputting, by a user, a batch express delivery storage instruction to the controller;

2) controlling, by the controller, the temporary storage cabinet door corresponding to one of the temporary storage units to be opened to allow the user to put an express delivery inside;

3) putting, by the user, the express delivery and closing the temporary storage cabinet door;

4) if the user selects to continue to store another express delivery, repeating step 2) and step 3);

5) if the user selects to not continue to store another express delivery, ending the step of storing the express delivery; and 6) after the temporary storage cabinet door in step 3) is closed, controlling, by the controller, the express delivery conveying device to convey the express delivery in the temporary storage unit to the storage unit.

Further, the temporary storage units comprise first-size units, second-size units and third-size units, the storage space of the first-size units and the storage space of the second-size units are larger than the storage space of the third-size units, and the storage space of the first-size units is larger than the storage space of the second-size units; and before step 2), the user selects the temporary storage unit with the corresponding size according to the size of the express delivery.

The present invention further provides an express delivery pickup method adopting the storage and pickup apparatus. The storage and pickup apparatus further comprises a wireless Internet access module. The controller is communicatively connected with a server through the wireless Internet access module. The user has a mobile terminal communicatively connected with the server. The express delivery pickup method comprises the following steps:

1) inputting, by the user, a reserved express delivery pickup instruction at the mobile terminal; and after the reserved express delivery pickup instruction is received, issuing, by the server, an instruction to the controller;

2) searching for, by the controller, the designated express delivery in the storage unit;
3) controlling, by the controller, the express delivery conveying device to convey the designated express delivery in the storage unit to the temporary storage unit;
4) before the user arrives at the storage and pickup apparatus, inputting an express delivery pickup instruction to the controller;
5) controlling, by the controller, the temporary storage cabinet door corresponding to the temporary storage unit to be opened for picking up the express delivery; and
6) picking up, by the user, the express delivery and closing the temporary storage cabinet door.

Further, the storage and pickup apparatus comprises a scanning device configured to calculate the size of the express delivery when the express delivery is warehoused in, and the scanning device is in information communication with the controller;

before step 3), the controller extracts the size information of the designated express delivery and calculates whether the designated express delivery is capable of being put into the temporary storage unit;

if the designated express delivery is capable of being put into the temporary storage unit, step 3) to step 6) are continuously executed; and if the designated express delivery is not capable of being put into the temporary storage unit, step 3) is stopped from being executed, and feedback information is sent to the mobile terminal of the user.

Figure 1:
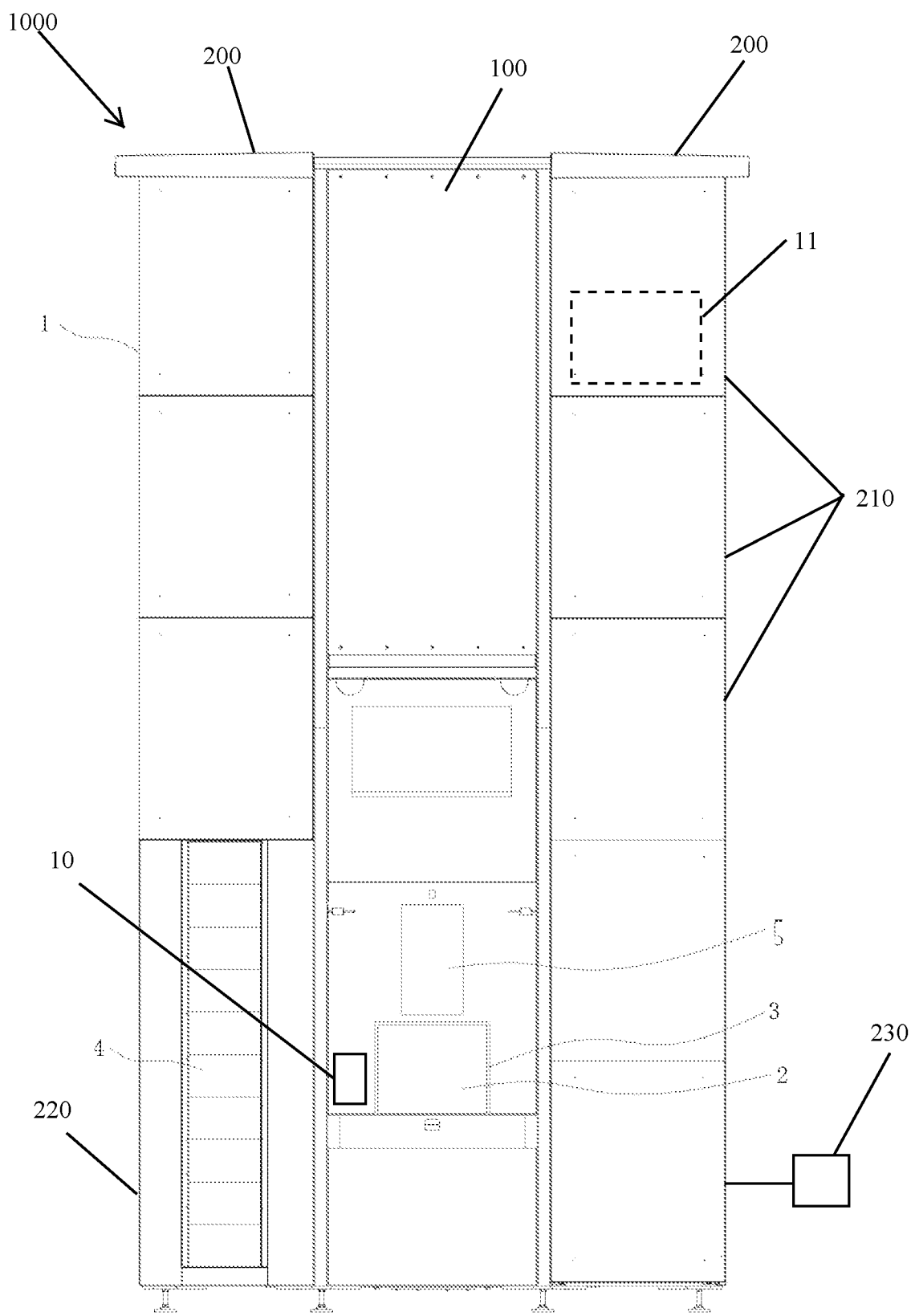
FIG. 1 is a schematic view of a storage and pickup apparatus according to embodiment 1 of the present invention.

In the drawings: 1—case, 2—cabinet door, 3—storage and pickup port, 4—temporary storage cabinet door, 5—operation and display device, 6—first-size unit, 7—second-size unit, 8—third-size unit.

DESCRIPTION OF THE EMBODIMENTS

The technical solutions of the embodiments of the present invention will be explained and described below with reference to the drawings of the embodiments of the present invention, but the following embodiments are only preferred embodiments of the present invention, not all of them. Based on the embodiments, other embodiments obtained by one skilled in the art without contributing any inventive labor belong to the protection scope of the present invention.

Referring to FIG. 1 to FIG. 7, a storage and pickup apparatus with batch express delivery storage and reserved express delivery pickup functions comprises a case with a polygonal cross section, an express delivery conveying device provided in the case, a plurality of rows of storage racks distributed around the express delivery conveying device and a controller electrically connected with the express delivery conveying device. A plurality of storage units are provided on the storage racks. A storage and pickup port with a cabinet door is provided in the case. The cabinet door is electrically connected with the controller and is capable of being opened or closed to open or close the storage and pickup port under the control of the controller. The express delivery conveying device is controlled by the controller and moves back and forth between the storage and pickup port and the storage units to realize warehousing-in and warehousing-out operations of express deliveries.

A plurality of temporary storage units are provided on the storage racks, temporary storage cabinet doors corresponding to the temporary storage units one to one are provided on the case, the temporary storage cabinet doors are electrically connected with the controller and are capable of being opened or closed under the control of the controller for temporary storage or pickup of express deliveries, and the express delivery conveying device is capable of conveying express deliveries in the temporary storage units to the storage units or conveying express deliveries in the storage units to the temporary storage units under the control of the controller.

When a user needs to store express deliveries in a batch, the user may input a batch express delivery storage instruction into the storage and pickup apparatus. After receiving the instruction, the controller controls the temporary storage cabinet door corresponding to a certain idle temporary storage unit to be opened. After the user puts the express delivery into the temporary storage unit, the user closes the temporary storage cabinet door to complete the storage of the first express delivery. Then, the user may select to continue to store an express delivery. After receiving an instruction for continuing to store an express delivery, the controller controls the temporary storage cabinet door corresponding to the next idle temporary storage unit to be opened so that the user can put the next express delivery. After the user puts the second express delivery into the temporary storage unit, the user closes the temporary storage cabinet door to complete the storage of the second express delivery. Then, the user may select to continue to store an express delivery or end the storage of express deliveries.

After the temporary storage cabinet door is switched from an open state to a closed state (after the user stores the express delivery and closes the temporary storage cabinet door), the controller controls the express delivery conveying device to convey the express delivery in the temporary storage unit to the storage unit to complete a warehousing-in operation. After a plurality of temporary storage cabinet doors are sequentially closed, the controller controls the express delivery conveying device to sequentially convey the express deliveries in the corresponding temporary storage units to the storage units to complete a batch warehousing-in operation.

In the storage and pickup apparatus provided by the present invention, a storage and pickup port is provided to complete ordinary express delivery storage and pickup operations, and the structure of temporary storage units is added. Therefore, the express delivery storage and warehousing-in operation is no longer a continuous action, but two independent steps. The user can continue to store express deliveries and leave after the storage of express deliveries is completed, and the express delivery conveying device of the storage and pickup apparatus automatically completes the subsequent warehousing-in action, thus reducing the time spent in storing express deliveries in a batch, and not requiring the user to wait in front of the storage and pickup apparatus.

When the user needs to pick up an express delivery on reservation, the user may remotely send an instruction to the storage and pickup apparatus (the user sends the instruction to a server through a mobile terminal, and the server issues the instruction to the controller of the storage and pickup apparatus), and the controller controls the express delivery conveying device to convey the designated express delivery in the storage unit to the temporary storage unit. In other words, before the user arrives at the storage and pickup apparatus, the storage and pickup apparatus can independently complete the warehousing-out action, the user does not need to wait for the warehousing-out action in front of the storage and pickup apparatus, and thus time is saved. After the user arrives, the user may immediately input the instruction for picking up the express delivery. The controller controls the temporary storage cabinet door corresponding to the temporary storage unit to be opened for the user to take out the express delivery.

Embodiment 1

A storage and pickup apparatus 1000 with batch express delivery storage and reserved express delivery pickup functions illustrated in FIG. 1 comprises a case 1 with a polygonal cross section, an express delivery conveying device 100 provided in the case 1, a plurality of rows of storage racks 200 distributed around the express delivery conveying device 100 and a controller 10 electrically connected with the express delivery conveying device 100. A plurality of storage units 210 is provided on the storage racks. A storage and pickup port 3 with a cabinet door 2 is provided in the case 1. The cabinet door 2 is electrically connected with the controller 10 and is capable of being opened or closed to open or close the storage and pickup port 3 under the control of the controller 10. The express delivery conveying device 100 is controlled by the controller 10 and moves back and forth between the storage and pickup port 3 and the storage units 210 to realize warehousing-in and warehousing-out operations of express deliveries.

A plurality of temporary storage units 220 are provided on the storage racks 200. Temporary storage cabinet doors 4 corresponding to the temporary storage units 220 one to one are provided on the case 1. The temporary storage cabinet doors 4 are electrically connected with the controller 10 and are capable of being opened or closed under the control of the controller 10 for temporary storage or pickup of express deliveries 11. The express delivery conveying device 100 is capable of conveying express deliveries 11 in the temporary storage units 220 to the storage units 210 or conveying express deliveries 11 in the storage units 210 to the temporary storage units 220 under the control of the controller 10.

An operation and display device 5 is provided on the case 1, the plurality of temporary storage units 220 are provided on the storage racks 200 on the left side of the operation and display device 5, and the plurality of temporary storage units 220 are arranged sequentially from top to bottom. The distance between the temporary storage units and the operation and display device 5 is short. After the user inputs the instruction on the operation and display device 5, the user can immediately perform the express delivery storage or pickup operation to the nearby temporary storage unit, the operation is convenient to perform, the labor is saved, the range involved in the operation process can be effectively reduced and the user does not need to move back and forth. The storage and pickup apparatus 1000 further comprises a scanning device 2030 configured to calculate the size of the express delivery.

Of course, the plurality of temporary storage units 220 may also be provided on the storage racks 200 on the right side of the operation and display device 5.

In the embodiment, the size of the plurality of temporary storage units 220 is the same. During batch storage of express deliveries, there is no need to select the size of the temporary storage units 220, so the storage speed is faster.

The storage and pickup apparatus provided by the present invention can also be used for batch express delivery storage and reserved express delivery pickup in addition to ordinary express delivery storage and pickup through the storage and pickup port 3. The ordinary express delivery storage and pickup steps are prior art, which are not repetitively described herein.

Figure 2:
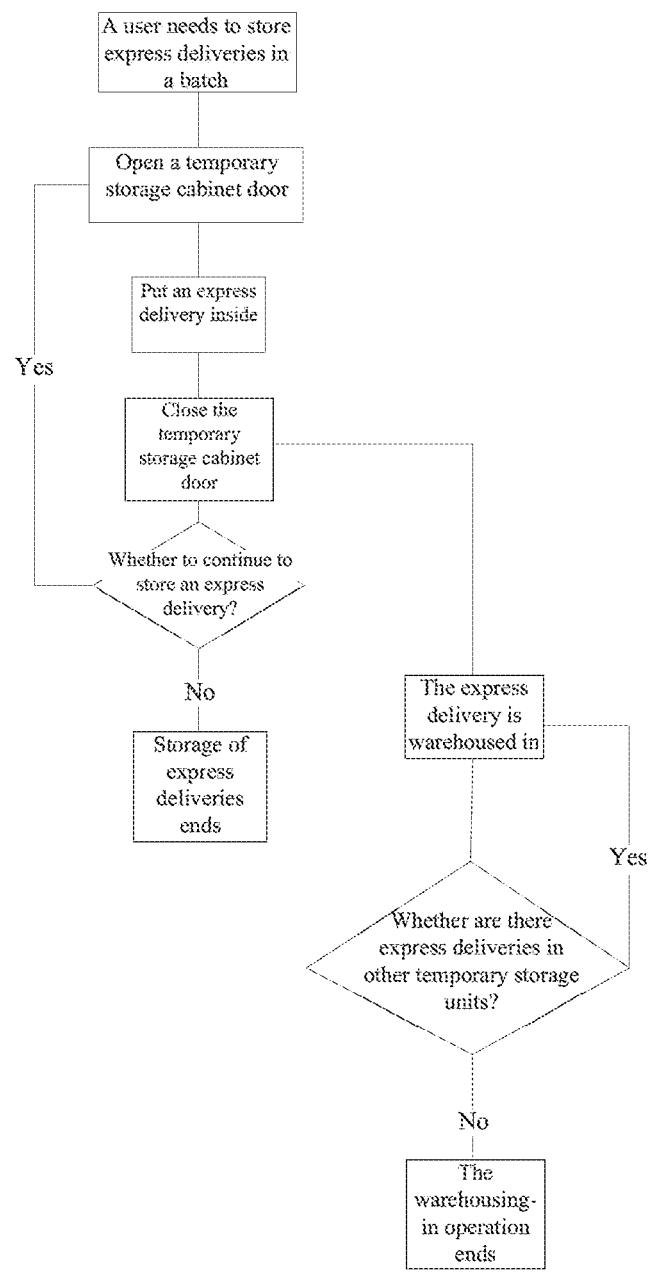
FIG. 2 is a batch express delivery pickup flowchart according to embodiment 1 of the present invention.
Figure 3:
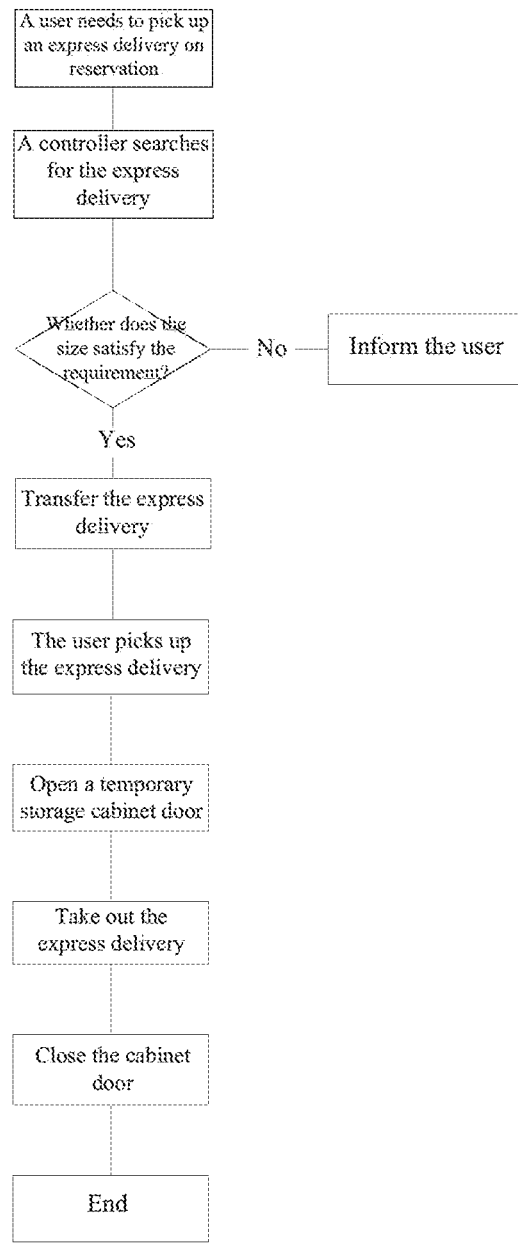
FIG. 3 is a reserved express delivery pickup flowchart according to embodiment 1 of the present invention.

Specifically, as illustrated in FIG. 2, the batch express delivery storage steps are as follows:

1) a user inputs a batch express delivery storage instruction to the controller;

2) the controller controls the temporary storage cabinet door 4 corresponding to one of the temporary storage units to be opened to allow the user to put an express delivery inside;

3) the user puts the express delivery and closes the temporary storage cabinet door 4;

4) if the user selects to continue to store another express delivery, step 2) and step 3) are repeated;

5) if the user selects to not continue to store another express delivery, the step of storing the express delivery is ended; and 6) after the temporary storage cabinet door 4 in step 3) is closed, the controller controls the express delivery conveying device to convey the express delivery in the temporary storage unit to the storage unit.

In the embodiment, when there are express deliveries in a plurality of temporary storage units, a detection device is used to detect whether there is an express delivery in each temporary storage unit. If it is detected that there is an express delivery in any of the temporary storage unit, the controller controls the express delivery conveying device to reach the temporary storage unit with the express delivery therein for storage in a storage unit and complete the express delivery warehousing-in operation. If it is detected that there is no longer an express delivery in any of the temporary storage units, the warehousing-in operation is ended.

Of course, the express delivery warehousing-in operation may be sequentially performed according to the sequence of closing the temporary storage cabinet doors 4.

The storage and pickup apparatus further comprises a wireless Internet access module, the controller is communicatively connected with a server through the wireless Internet access module, and the user has a mobile terminal communicatively connected with the server. The storage and pickup apparatus further comprises a scanning device configured to calculate the size of the express delivery when the express delivery is warehoused in, and the scanning device is in information communication with the controller.

The reserved express delivery pickup method comprises the following steps:

1) the user inputs a reserved express delivery pickup instruction at the mobile terminal for a designated express delivery stored in a storage unit for pickup; and after the reserved express delivery pickup instruction is received, the server issues an instruction to the controller;

2) the controller searches for the designated express delivery in the storage unit;
3) the controller extracts the size information of the designated express delivery and calculates whether the designated express delivery is capable of being put into the temporary storage unit;
if the designated express delivery is not capable of being put into the temporary storage unit, subsequent steps are stopped from being executed, and feedback information is sent to the mobile terminal of the user; and
if the designated express delivery is capable of being put into the temporary storage unit, subsequent steps are continuously executed;
4) the controller controls the express delivery conveying device to convey (transfer) the designated express delivery in the storage unit to the temporary storage unit;
5) before the user arrives at the storage and pickup apparatus, the user inputs an express delivery pickup instruction to the controller;
6) the controller controls the temporary storage cabinet door 4 corresponding to the temporary storage unit to be opened for picking up the express delivery; and
7) the user picks up the express delivery and closes the temporary storage cabinet door 4.

Embodiment 2

The difference of the embodiment from embodiment 1 lies in that the structure of the temporary storage units is different.

Figure 4:
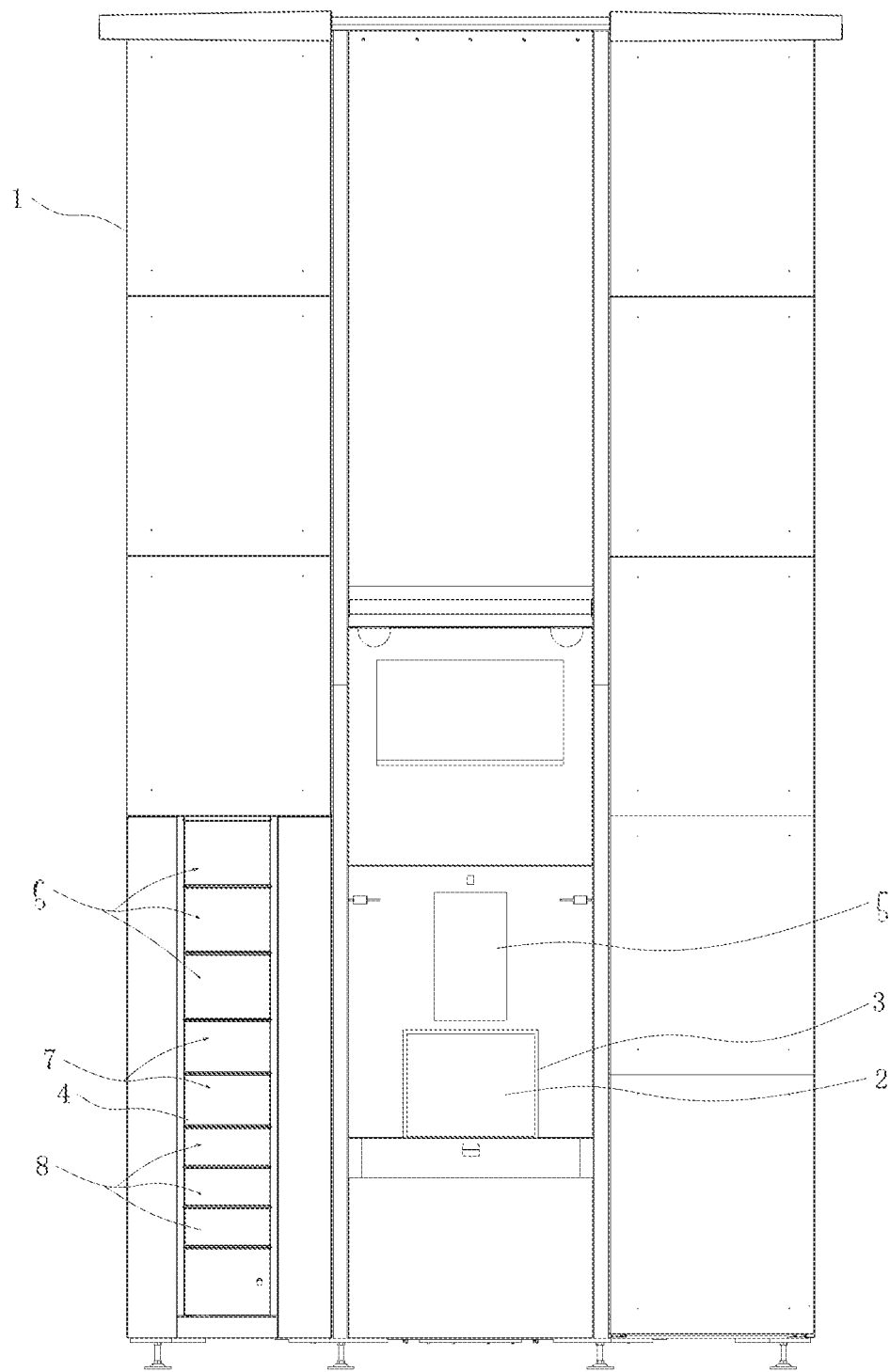
FIG. 4 is a schematic view of a storage and pickup apparatus according to embodiment 2 of the present invention.

As illustrated in FIG. 4, in the embodiment, the temporary storage units comprise first-size units 6, second-size units 7 and third-size units 8. The storage space of the first-size units 6 and the storage space of the second-size units 7 are larger than the storage space of the third-size units 8, and the storage space of the first-size units 6 is larger than the storage space of the second-size units 7. In other words, the first-size units 6, the second-size units 7 and the third-size units 8 in the temporary storage units are storage spaces with three different sizes respectively. During batch storage of express deliveries, the user can select the appropriate temporary storage units according to the size of the express delivery, and the space utilization rate of the storage and pickup apparatus is higher.

The first-size units 6, the second-size units 7 and the third-size units 8 are arranged sequentially from top to bottom.

Specifically, the size of the first-size units 6 is 60 cm*40 cm*25 cm (L*W*H); the size of the second-size units 7 is 60 cm*40 cm*20 cm (L*W*H); and the size of the third-size units 8 is 60 cm*40 cm*15 cm (L*W*H).

The number of the first-size units 6 is three, the number of the second-size units 7 is two and the number of the third-size units 8 is three.

Figure 5:
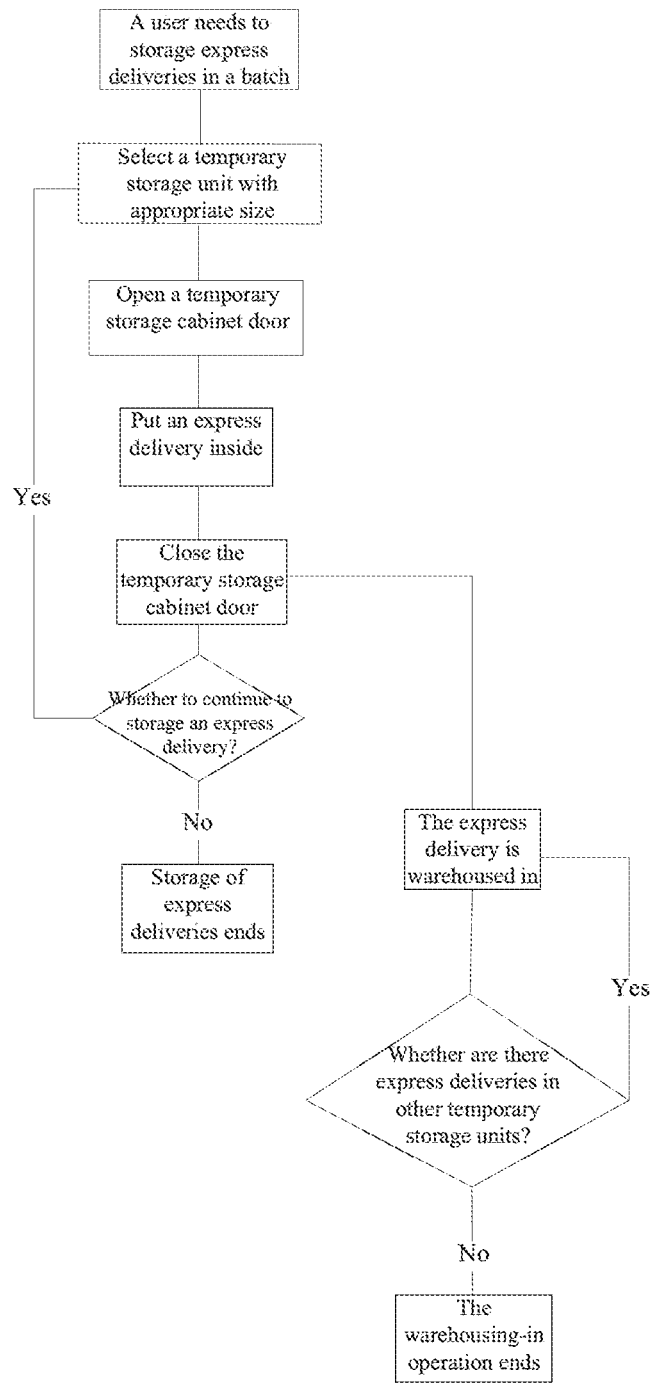
FIG. 5 is a batch express delivery pickup flowchart according to embodiment 2 of the present invention.

As illustrated in FIG. 5, the specific steps for batch express delivery storage in the embodiment are as follows:
1) a user inputs a batch storage instruction to the controller;
2) the user selects a temporary storage unit with the appropriate size according to the size of the express delivery;
3) the controller controls the temporary storage cabinet door 4 corresponding to one of the temporary storage units to be opened to allow the user to put an express delivery inside;
4) the user puts the express delivery and closes the temporary storage cabinet door 4;
5) if the user selects to continue to store another express delivery, step 2), step 3) and step 4) are repeated;
6) if the user selects to not continue to store another express delivery, the step of storing the express delivery is ended; and
7) after the temporary storage cabinet door 4 in step 4) is closed, the controller controls the express delivery conveying device to convey the express delivery in the temporary storage unit to the storage unit.

When there are express deliveries in a plurality of temporary storage units, a detection device is used to detect whether there is an express delivery in each temporary storage unit. If it is detected that there is an express delivery in the temporary storage unit, the controller controls the express delivery conveying device to reach the temporary storage unit and complete the express delivery warehousing-in operation. If it is detected that there is no express delivery in the temporary storage unit, the warehousing-in operation is ended.

Embodiment 3

The difference of the embodiment from embodiment 1 lies in that the structure of the temporary storage units is different.

Figure 6:
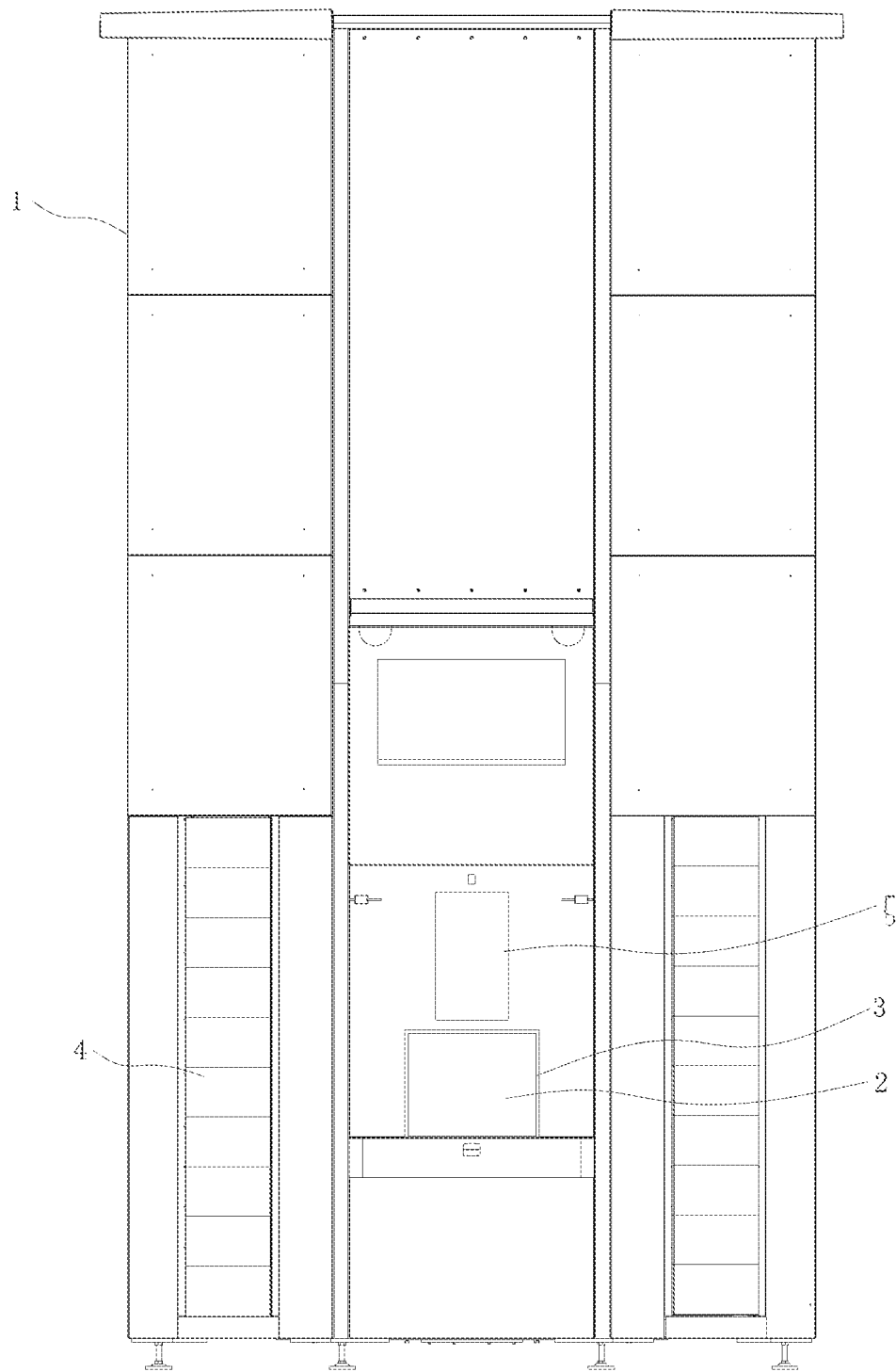
FIG. 6 is a schematic view of a storage and pickup apparatus according to embodiment 3 of the present invention.

As illustrated in FIG. 6, in the embodiment, the plurality of temporary units are provided on the left side and right side of the operation and display device 5, the plurality of temporary storage units are sequentially arranged from top to bottom, and the size of the temporary storage units is the same.

The number of the temporary storage units in the storage and pickup apparatus in the embodiment is larger, and the demand of large-batch express delivery storage can be satisfied.

The batch express delivery storage steps of the storage and pickup apparatus in the embodiment may be the same as the steps in embodiment 1. It may also be configured as that, after the temporary storage units on the storage racks on one side are full of express deliveries, the express delivery conveying device starts to work.

Besides, the storage and pickup apparatus in the embodiment can also provide reserved express delivery pickup service. However, after the express deliveries to be picked up on reservation fully fill the temporary storage units on one side, reserved express delivery pickup requests are stopped from being accepted, so that the temporary storage units on the other side are always available for batch express delivery storage.

Embodiment 4

The difference of the embodiment from embodiment 1 lies in that the structure of the temporary storage units is different.

Figure 7:
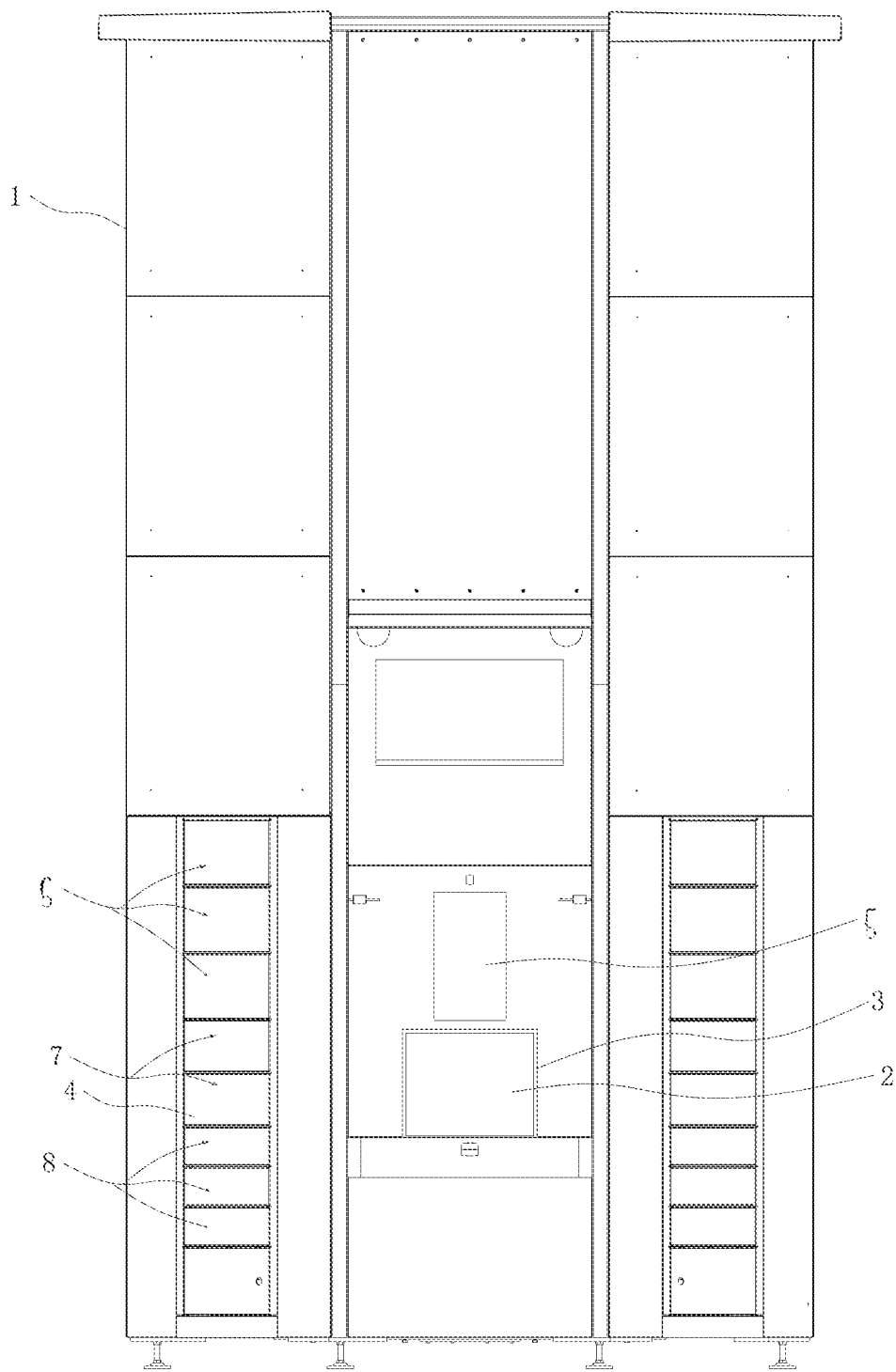
FIG. 7 is a schematic view of a storage and pickup apparatus according to embodiment 4 of the present invention.

As illustrated in FIG. 7, in the embodiment, the plurality of temporary units are provided on the left side and right side of the operation and display device 5, the plurality of temporary storage units are sequentially arranged from top to bottom, and the sizes of the temporary storage units are different. The number of the temporary storage units in the storage and pickup apparatus in the embodiment is larger, and the demand of large-batch express delivery storage can be satisfied.

The temporary storage units comprise first-size units 6, second-size units 7 and third-size units 8. The storage space of the first-size units 6 and the storage space of the second-size units 7 are larger than the storage space of the third-size units 8, and the storage space of the first-size units 6 is larger than the storage space of the second-size units 7. In other words, the first-size units 6, the second-size units 7 and the third-size units 8 in the temporary storage units are storage spaces with three different sizes respectively. During batch storage of express deliveries, the user can select the appropriate temporary storage units according to the size of the express delivery, and the space utilization rate of the storage and pickup apparatus is higher.

The first-size units 6, the second-size units 7 and the third-size units 8 are arranged sequentially from top to bottom.

Specifically, the size of the first-size units 6 is 60 cm*40 cm*25 cm (L*W*H); the size of the second-size units 7 is 60 cm*40 cm*20 cm (L*W*H); and the size of the third-size units 8 is 60 cm*40 cm*15 cm (L*W*H).

In the temporary storage units on one side, the number of the first-size units 6 is three, the number of the second-size units 7 is two and the number of the third-size units 8 is three.

The batch express delivery storage steps of the storage and pickup apparatus in the embodiment may be the same as the steps in embodiment 1. It may also be configured as that, after the temporary storage units on the storage racks on one side are full of express deliveries, the express delivery conveying device starts to work.

Besides, the storage and pickup apparatus in the embodiment can also provide reserved express delivery pickup service. However, after the express deliveries to be picked up on reservation fully fill the temporary storage units on one side, reserved express delivery pickup requests are stopped from being accepted, so that the temporary storage units on the other side are always available for batch express delivery storage.

The embodiments described above are just specific embodiments of the present invention. However, the protection scope of the present invention is not limited thereto. One skilled in the art should understand that the present invention includes but is not limited to the contents described in the drawings and the above specific embodiments. Any modification not deviating from the functional and structural principles of the present invention should be included in the scope of the claims.

The invention claimed is:

1. A storage and pickup apparatus with batch express delivery storage and reserved express delivery pickup functions, comprising:
    a case with a polygonal cross section,
    an express delivery conveying device,
    a plurality of rows of storage racks distributed around the express delivery conveying device, a plurality of storage units and a plurality of temporary storage units being arranged on the storage rack, and
    a controller electrically connected with the express delivery conveying device,
    a storage and pickup port arranged on the case, the storage and pickup port comprising a cabinet door, the cabinet door being electrically connected with the controller and being capable of being opened or closed to open or close the storage and pickup port under the control of the controller,
    wherein the express delivery conveying device is controlled by the controller and moving back and forth between the storage and pickup port and the storage units to realize warehousing-in and warehousing-out operations of express deliveries,
    the apparatus further comprising:
    a plurality of temporary storage cabinet doors each corresponding to the temporary storage units respectively arranged on the case,
    the temporary storage cabinet doors are electrically connected with the controller and are capable of being opened or closed under the control of the controller for temporary storage or pickup of express deliveries, and
    under the control of the controller, the express delivery conveying device is capable of:
        conveying express deliveries in the temporary storage units to the storage units, and
        conveying express deliveries in the storage units to the temporary storage units.

2. The storage and pickup apparatus according to claim 1, further comprising:
    an operation and display device arranged on the case,
    wherein the plurality of temporary storage units are arranged on the storage racks on the left side and/or right side of the operation and display device, and
    the plurality of temporary storage units are arranged sequentially from top to bottom.

3. The storage and pickup apparatus according to claim 1, wherein the size of the plurality of temporary storage units is the same.

4. The storage and pickup apparatus according to claim 1, wherein the temporary storage units comprise first-size units, second-size units and third-size units, the storage space of the first-size units and the storage space of the second-size units are larger than the storage space of the third-size units, and the storage space of the first-size units is larger than the storage space of the second-size units.

5. The storage and pickup apparatus according to claim 4, wherein the first-size units, the second-size units and the third-size units are arranged sequentially from top to bottom.

6. An express delivery storage method adopting the storage and pickup apparatus according to claim 1, comprising the following steps:
    1) Inputting, by a user, a batch express delivery storage instruction to the controller;
    2) Controlling, by the controller, the temporary storage cabinet door corresponding to one of the temporary storage units to be opened to allow the user to put an express delivery inside;
    3) Putting, by the user, the express delivery and closing the temporary storage cabinet door;
    4) If the user selects to continue to store another express delivery, repeating step 2) and step 3); and
    if the user selects to not continue to store another express delivery, ending the step of storing the express delivery; and
    5) After the temporary storage cabinet door in step 3) is closed, controlling, by the controller, the express delivery conveying device to convey the express delivery in the temporary storage unit to the storage unit.

7. The express delivery storage method according to claim 6, wherein the temporary storage units comprise first-size units, second-size units and third-size units, the storage space of the first-size units and the storage space of the second-size units are larger than the storage space of the third-size units, and the storage space of the first-size units is larger than the storage space of the second-size units; and
    before step 2), the user selects the temporary storage unit with the corresponding size according to the size of the express delivery.

8. An express delivery pickup method adopting the storage and pickup apparatus according to claim 1, the storage and pickup apparatus further comprising a wireless Internet access module, the controller being communicatively connected with a server through the wireless Internet access module, the user having a mobile terminal communicatively connected with the server, the express delivery pickup method comprising the following steps:
1) Inputting, by the user, a reserved express delivery pickup instruction at the mobile terminal; and after the reserved express delivery pickup instruction is received, issuing, by the server, an instruction to the controller;
2) Searching for, by the controller, the designated express delivery in the storage unit;
3) Controlling, by the controller, the express delivery conveying device to convey the designated express delivery in the storage unit to the temporary storage unit;
4) Before the user arrives at the storage and pickup apparatus, inputting an express delivery pickup instruction to the controller;
5) Controlling, by the controller, the temporary storage cabinet door corresponding to the temporary storage unit to be opened for picking up the express delivery; and
6) Picking up, by the user, the express delivery and closing the temporary storage cabinet door.

9. The express delivery pickup method according to claim 8, wherein the storage and pickup apparatus comprises a scanning device configured to calculate the size of the express delivery when the express delivery is warehoused in, and the scanning device is in information communication with the controller;

before step 3), the controller extracts the size information of the designated express delivery and calculates whether the designated express delivery is capable of being put into the temporary storage unit;

if the designated express delivery is capable of being put into the temporary storage unit, step 3) to step 6) are continuously executed; and if the designated express delivery is not capable of being put into the temporary storage unit, step 3) is stopped from being executed, and feedback information is sent to the mobile terminal of the user.

* * * * *